(12) United States Patent
Hong et al.

(10) Patent No.: US 11,927,835 B2
(45) Date of Patent: Mar. 12, 2024

(54) FUNCTIONAL CONTACT LENS AND MANUFACTURING METHOD THEREFOR

(71) Applicants: SEOUL NATIONAL UNIVERSITY R&DB FOUNDATION, Seoul (KR); GRAPHENE SQUARE INC., Seoul (KR)

(72) Inventors: Byung Hee Hong, Gyeonggi-do (KR); Sangkyu Lee, Gyeonggi-do (KR); Insu Jo, Jeollabuk-do (KR); Sangmin Kang, Seoul (KR)

(73) Assignees: SEOUL NATIONAL UNIVERSITY R&DB FOUNDATION, Seoul (KR); GRAPHENE SQUARE INC., Seoul (KR)

( * ) Notice: Subject to any disclaimer, the term of this patent is extended or adjusted under 35 U.S.C. 154(b) by 855 days.

(21) Appl. No.: 16/496,875

(22) PCT Filed: Aug. 14, 2017

(86) PCT No.: PCT/KR2017/008847
§ 371 (c)(1),
(2) Date: Jan. 10, 2020

(87) PCT Pub. No.: WO2018/174351
PCT Pub. Date: Sep. 27, 2018

(65) Prior Publication Data
US 2020/0201075 A1 Jun. 25, 2020

(30) Foreign Application Priority Data
Mar. 24, 2017 (KR) .................... 10-2017-0037927

(51) Int. Cl.
*G02C 7/04* (2006.01)
*B29D 11/00* (2006.01)
(Continued)

(52) U.S. Cl.
CPC ........ *G02C 7/049* (2013.01); *B29D 11/00038* (2013.01); *B32B 9/007* (2013.01);
(Continued)

(58) Field of Classification Search
None
See application file for complete search history.

(56) References Cited

U.S. PATENT DOCUMENTS 7,553,880 B2 * 6/2009 Nicolson ............ C08G 18/8175
523/106
9,726,861 B2 8/2017 Hong et al.
(Continued)

FOREIGN PATENT DOCUMENTS

JP 2013043820 A 3/2013
KR 20110138074 A 12/2011
(Continued)

OTHER PUBLICATIONS

Yushi Zhang, et al., "Graphene woven fabric as high-resolution sensing element of contact-lens tonometer" 2014 IEEE 27th International Conference on Micro Electro Mechanical Systems.
(Continued)

*Primary Examiner* — Tae H Yoon
(74) *Attorney, Agent, or Firm* — Dilworth IP, LLC

(57) ABSTRACT

The present specification provides a functional contact lens including: a lens substrate having a spherically curved surface so as to be worn on an eyeball; and a functional layer provided on at least one surface of the lens substrate and including a graphene sheet, and a method for manufacturing the same.

13 Claims, 5 Drawing Sheets

(51) Int. Cl.
*B32B 9/00* (2006.01)
*B32B 9/04* (2006.01)
*B32B 37/24* (2006.01)
*G02C 7/10* (2006.01)

(52) U.S. Cl.
CPC .............. *B32B 9/045* (2013.01); *B32B 37/24* (2013.01); *G02C 7/104* (2013.01); *B29K 2995/0026* (2013.01); *B32B 2307/412* (2013.01); *B32B 2551/00* (2013.01)

(56) References Cited

U.S. PATENT DOCUMENTS

| | | |
|---|---|---|
| 2012/0282419 A1 | 11/2012 | Ahn et al. |
| 2013/0027778 A1 | 1/2013 | Currie et al. |
| 2013/0068521 A1 | 3/2013 | Hong et al. |
| 2014/0199542 A1 | 7/2014 | Li et al. |
| 2016/0266406 A1 | 9/2016 | Meyers et al. |
| 2016/0299354 A1* | 10/2016 | Shtukater .................. G02C 7/04 |
| 2018/0177632 A1* | 6/2018 | Herekar ................ A61F 9/0017 |

FOREIGN PATENT DOCUMENTS

| | | |
|---|---|---|
| KR | 20130124820 A | 11/2013 |
| KR | 101454270 B1 | 11/2014 |
| WO | 2013168968 A1 | 11/2013 |
| WO | WO 2015083860 A1 * | 6/2015 |
| WO | 2015199624 A1 | 12/2015 |
| WO | WO 2016/076523 A1 * | 5/2016 |
| WO | 2016149532 A1 | 9/2016 |

OTHER PUBLICATIONS

S. Kaur, et al., "Graphene electrodes for adaptive liquid crystal contact lenses", Optics Express, vol. 24, No. 8, p. 8782-8787, Apr. 2016.

Office Action in JP Patent Application No. 2019552488 dated Mar. 15, 2021.

Lee et al., "Smart Contact Lenses with Graphene Coating for Electromagnetic Interference Shielding and Dehydration Protection", Acs Nano, Published Feb. 15, 2017, 7 pages.

PCT International Search Report dated Dec. 6, 2017 in corresponding Application No. PCT/KR2017/008847, 3 pages.

* cited by examiner

[Figure 1]
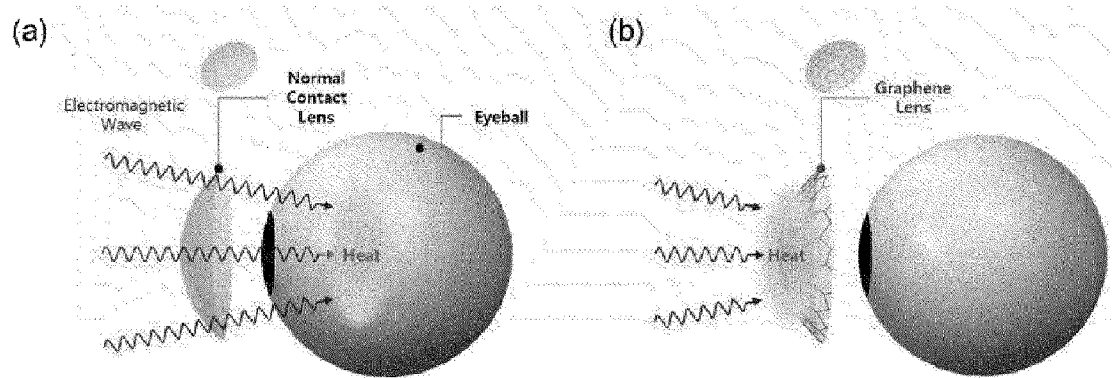
[Figure 2]
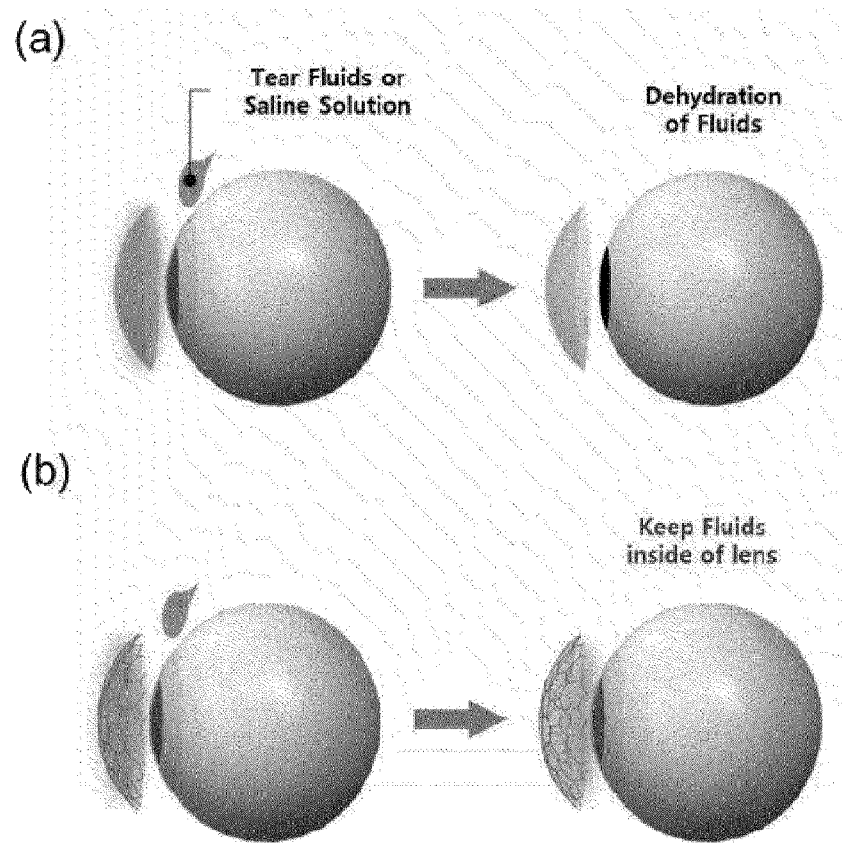

[Figure 3]
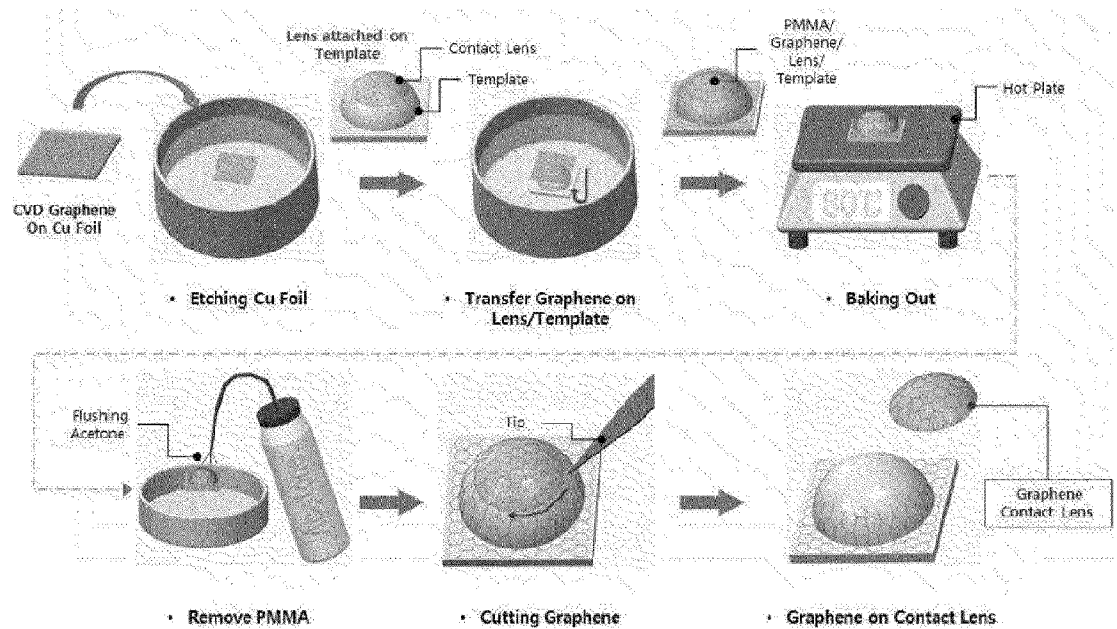
[Figure 4]
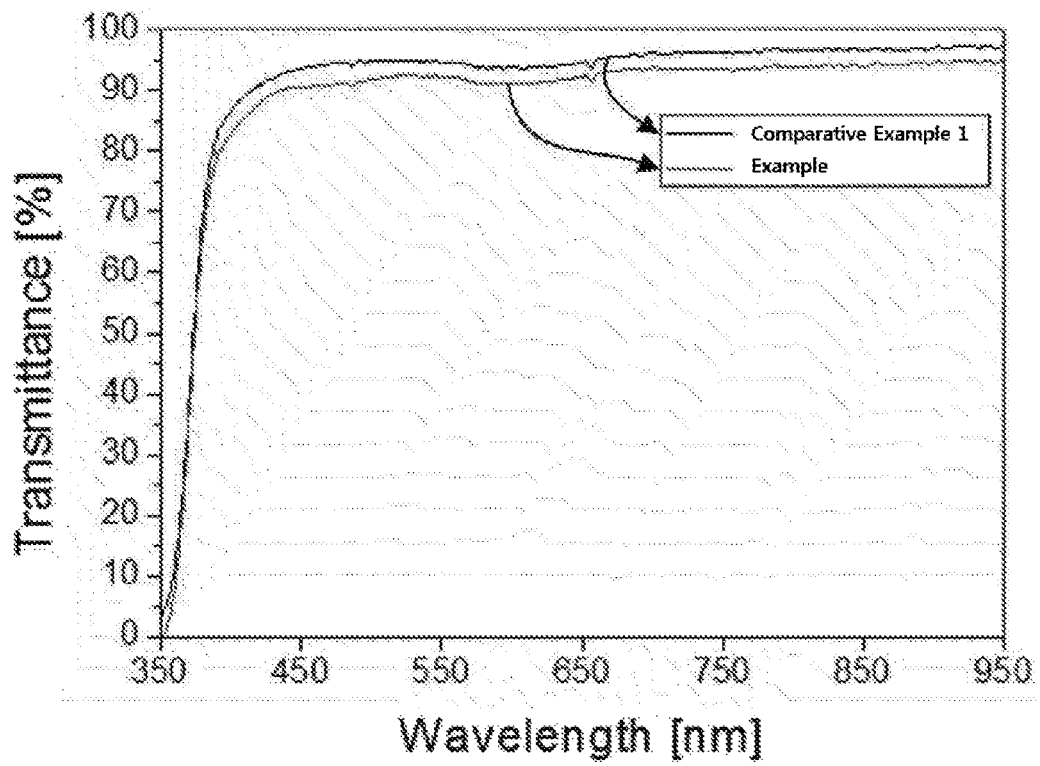

[Figure 5]
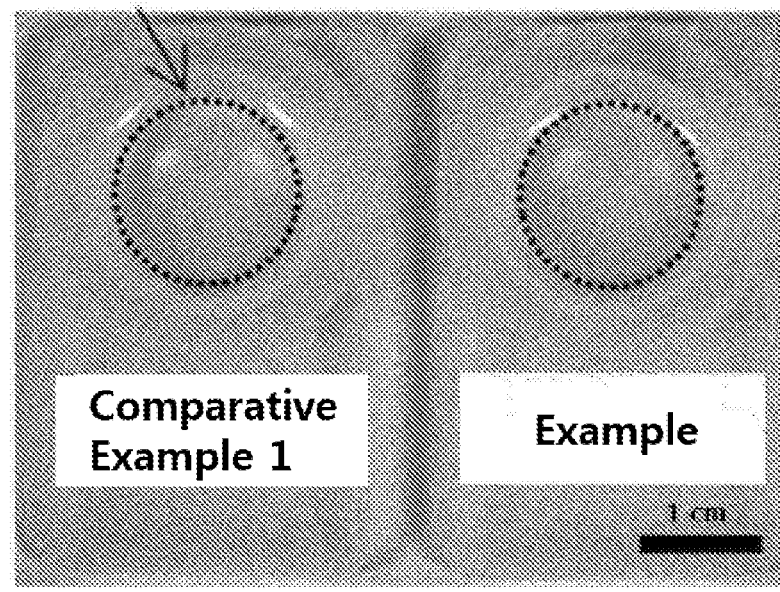
[Figure 6]
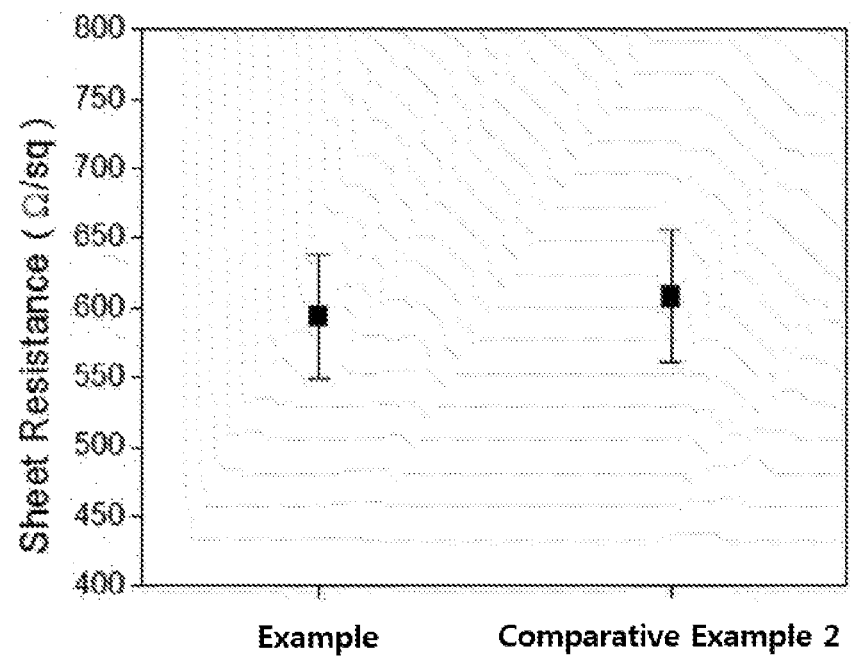

[Figure 7]
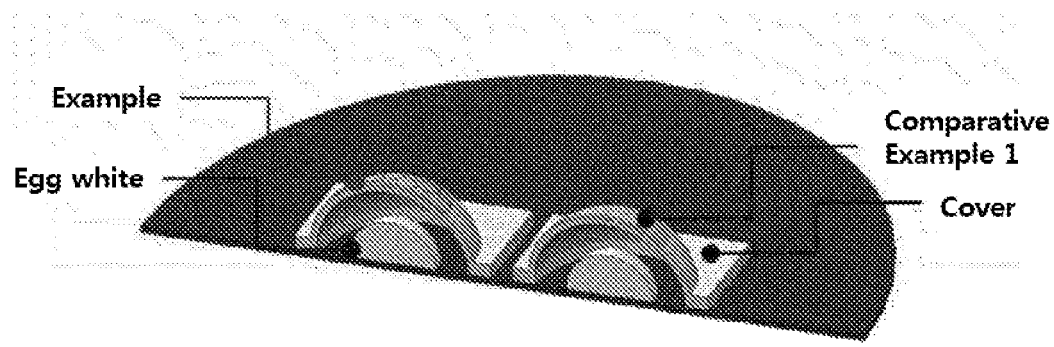
[Figure 8]
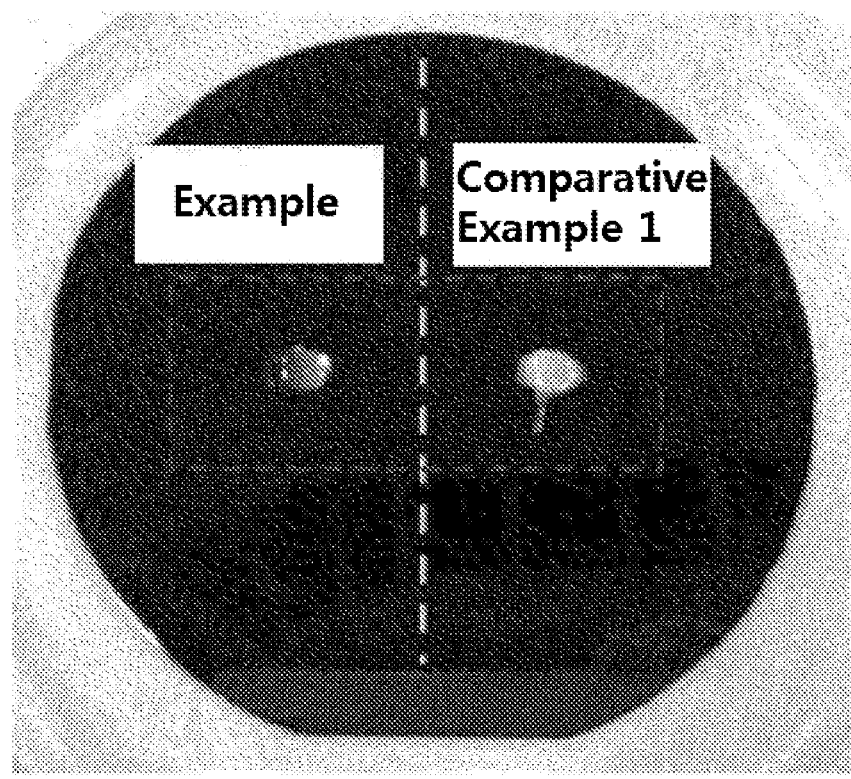

[Figure 9]
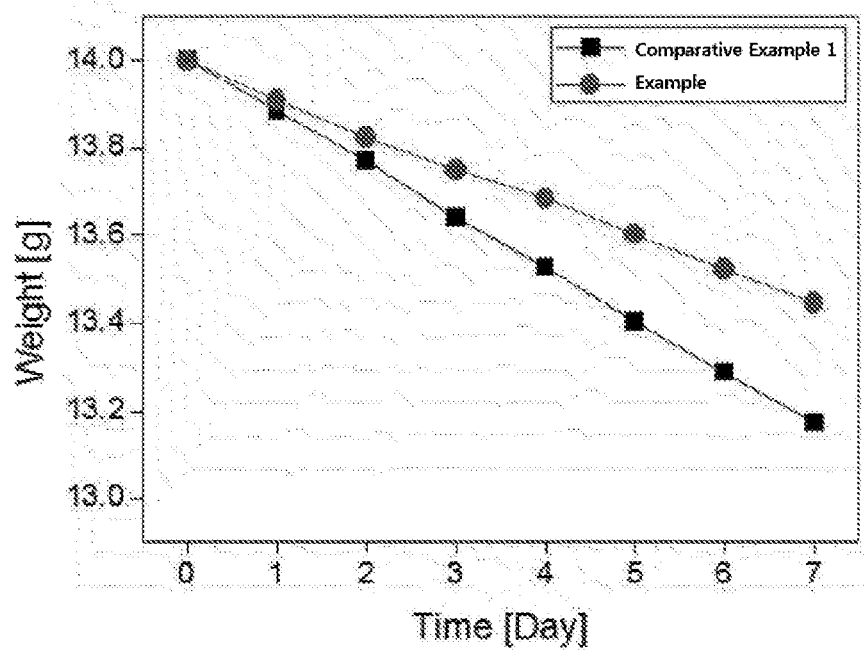
[Figure 10]
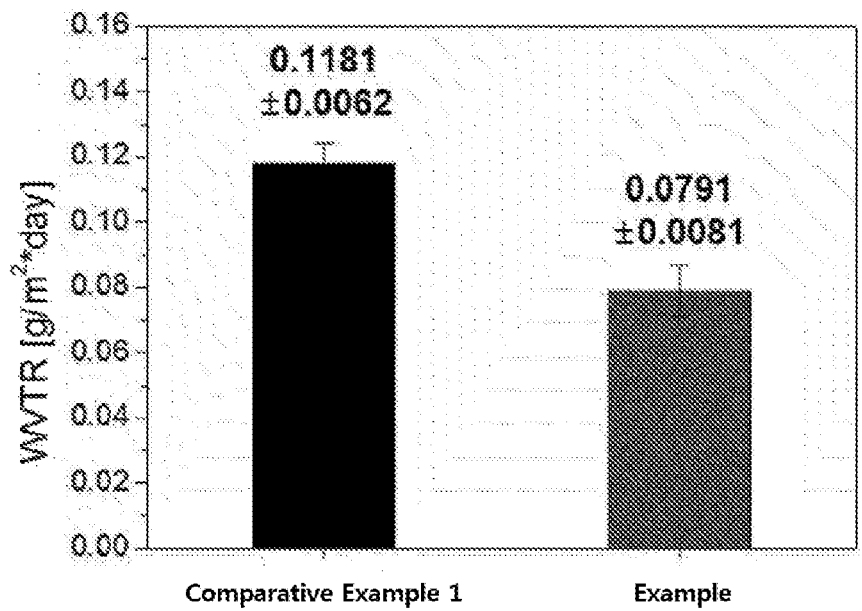

ical waves and a method for manufacturing the same.

BACKGROUND OF THE INVENTION

In recent years, due to an increase in the Internet of Things and electronic devices, the frequency of exposure to environmental electromagnetic waves has increased. Furthermore, due to an increase in the size of display devices and frequent exposure thereto, the influence of electromagnetic waves entering the eyes cannot be ignored, and hence may cause a decrease in vision, etc.

In recent years, there have been reports of studies on embedding sensors or displays into contact lenses to be used for vision correction and cosmetic purposes, but there has been no study on a functional contact lens having a functional layer including a graphene sheet.

The present disclosure intends to provide a functional contact lens and a method for manufacturing the same.

However, problems to be solved by the present disclosure are not limited to the above-mentioned problem, and other problems which are not mentioned will be clearly understood by those skilled in the art from the following description.

SUMMARY OF THE INVENTION

One embodiment of the present disclosure provides a functional contact lens including: a lens substrate having a spherically curved surface so as to be worn on an eyeball; and a functional layer provided on at least one surface of the lens substrate and including a graphene sheet.

One embodiment of the present disclosure provides a method for manufacturing the functional contact lens, including the steps of: preparing a lens substrate; forming a graphene sheet on a graphene growth support; forming a polymer support layer on the graphene sheet; removing the graphene growth support; and transferring the graphene sheet provided on the polymer support layer onto at least one surface of the lens substrate.

The functional contact lens according to one embodiment of the present disclosure may effectively shield electromagnetic waves entering from the outside, thereby protecting the user's eye.

The functional contact lens according to one embodiment of the present disclosure has the advantage of having an excellent light transmittance, even though the functional contact lens includes the functional layer.

The functional contact lens according to one embodiment of the present disclosure has excellent water retention ability, and hence may prevent the user's eyeball from becoming dry.

BRIEF DESCRIPTION OF DRAWINGS

FIG. 1 schematically illustrates the electromagnetic wave shielding effect of a functional contact lens according to one embodiment of the present disclosure.

FIG. 2 schematically illustrates the water evaporation suppression effect of the functional contact lens according to one embodiment of the present disclosure.

FIG. 3 illustrates a manufacturing process according to one embodiment of the present disclosure.

FIG. 4 is a graph obtained by measuring the wavelength-dependent light transmittances of a functional contact lens according to an Example and a contact lens according to a Comparative Example.

FIG. 5 shows samples for visual observation of the functional contact lens according to the Example and the contact lens according to the Comparative Example.

FIG. 6 schematically shows the section of a sample prepared in order to examine electromagnetic wave shielding performance according to Test Example 3.

FIG. 7 schematically shows the section of a sample prepared in order to examine electromagnetic wave shielding performance according to Test Example 3.

FIG. 8 shows the results of the Example and Comparative Example 1 after exposure to electromagnetic waves according to Test Example 3.

FIG. 9 shows the results of a water permeability test performed according to Test Example 4.

FIG. 10 shows the data obtained by measuring the water permeability of each of the functional contact lens according to the Example and the contact lens according to Comparative Example 1.

DETAILED DESCRIPTION OF THE INVENTION

Throughout the present specification, when any member is referred to as being "on" another member, it not only refers to a case where any member is in contact with another member, but also a case where a third member exists between the two members.

Throughout the present specification, it is to be understood that, when any part is referred to as "including" any component, it does not exclude other components, but may further include other components, unless otherwise specified.

The "graphene sheet" in the present specification refers to a graphene layer or sheet formed of polycyclic aromatic molecules in which a plurality of carbon atoms are connected together by covalent bonds. The carbon atoms connected together by covalent bonds may form a six-membered ring as a basic repeating unit, but the graphene sheet may further contain a five-membered ring and/or a seven-membered ring. Thus, the graphene sheet appears as a single layer of carbon atoms connected together by covalent bonds (usually sp 2 bonds). The graphene sheet may have various structures, and such structures may vary depending on the content of a five-membered ring and/or a seven-membered ring, which may be contained in the graphene. The graphene sheet may be composed of a single layer of the graphene as described above. However, several layers of the graphene may also be stacked on one another to form a plurality of layers. Generally, the lateral ends of the graphene may be saturated with hydrogen atoms.

Hereinafter, the present specification will be described in more detail.

One embodiment of the present disclosure provides a functional contact lens including: a lens substrate having a spherically curved surface so as to be worn on an eyeball; and a functional layer provided on at least one surface of the lens substrate and including a graphene sheet.

According to one embodiment of the present disclosure, the functional layer may have a high light transmittance and function to shield electromagnetic waves and prevent water evaporation from an eyeball.

According to one embodiment of the present disclosure, the functional layer may absorb or reflect electromagnetic waves entering from the outside. Specifically, the functional layer may be an electromagnetic wave shielding layer. In addition, the functional layer may be a highly transparent layer functioning to shield electromagnetic waves and prevent dry eye from occurring.

According to one embodiment of the present disclosure, the functional contact lens may have an electromagnetic wave shielding rate of $1.0 \times 10^4$ dB/μm or higher. Specifically, the functional contact lens may exhibit an electromagnetic wave shielding rate of $1.0 \times 10^4$ dB/μm or higher, and thus has an advantage in that the functional contact lens may effectively shield electromagnetic waves from entering an eyeball in everyday life.

FIG. 1 schematically illustrates the electromagnetic wave shielding effect of a functional contact lens according to one embodiment of the present disclosure. Specifically, FIG. 1(a) shows that when a common contact lens including no functional layer is worn on an eyeball, electromagnetic waves enter the eyeball. FIG. 1(b) shows that when the functional contact lens of the present disclosure, which includes the functional layer, is worn on an eyeball, electromagnetic waves are shielded from entering the eyeball.

In the case of FIG. 1(a), since the contact lens cannot shield electromagnetic waves, the electromagnetic waves may enter the eyeball, and thus the eyeball may be damaged by heat or exposure to the electromagnetic waves. On the contrary, in the case of FIG. 1(b), since electromagnetic waves are prevented from entering the eyeball by the functional layer, the eyeball may be protected from external electromagnetic waves. Furthermore, heat, generated in the functional layer due to the absorption of electromagnetic waves, etc., is easily released to the outside, and thus does not adversely affect the user's eyeball.

According to one embodiment of the present disclosure, the functional layer may be provided on the outer surface of the lens substrate. When the functional layer is provided on the outer surface of the lens substrate, there is an advantage in that the functional layer may effectively shield electromagnetic waves at a position farther away from the user's eyeball.

The outer surface of the lens substrate may mean a surface that faces outward when a user wears the functional contact lens.

According to one embodiment of the present disclosure, the functional layer may include a graphene sheet having 1 to layers. Specifically, the functional layer may include a graphene sheet having 1 to 5 layers. More specifically, the functional layer may be a monolayer graphene sheet.

When the functional layer includes a graphene sheet having 1 to 10 layers, the functional layer may exhibit an excellent electromagnetic wave shielding property and an excellent light transmittance. If the functional layer includes a graphene sheet having more than 10 layers, improvement in the electromagnetic wave shielding performance of the functional layer may be insignificant and the manufacturing cost may increase. In addition, if the functional layer includes a graphene sheet having more than 10 layers, a decrease in the light transmittance of the functional layer may occur.

According to one embodiment of the present disclosure, the light transmittance of the functional layer at a wavelength of 550 nm may be 50% to 98%. Specifically, according to one embodiment of the present disclosure, the light transmittance of the functional layer at a wavelength of 550 nm may be 80% to 95%.

Since the functional contact lens includes the functional layer having a high light transmittance, a user may not feel the decrease in light transmittance caused by the functional layer when the user wears the functional contact lens.

According to one embodiment of the present disclosure, the functional layer may be composed of the graphene sheet. In addition, according to one embodiment of the present disclosure, the functional layer may further include an additional layer on one surface of the graphene sheet. The additional layer may function either to further impart a functional different from that of the graphene sheet of the functional layer to the functional contact lens, or to assist the function of the graphene sheet.

According to one embodiment of the present disclosure, the functional layer may further include a transparent polymer layer on the graphene sheet. The transparent polymer layer may function as a protective layer that protects the graphene sheet. The transparent polymer layer may be the same as a polymer support layer which is described below with respect to a manufacturing method.

The light transmittance of the transparent polymer layer may be 80% to 95% at a wavelength of 550 nm.

According to one embodiment of the present disclosure, the graphene sheet may be provided as a full-surface layer on one surface of the lens substrate. The graphene sheet provided as the full-surface layer may mean that the graphene sheet completely covers one surface of the lens substrate.

In addition, according to one embodiment of the present disclosure, the graphene sheet may be provided as a patterned layer on one surface of the lens substrate.

According to one embodiment of the present specification, the graphene sheet may be provided as a patterned layer on a region of the lens substrate, which corresponds to the pupil of an eyeball. Specifically, the graphene sheet may be patterned on the central portion of the lens substrate, and thus may shield electromagnetic waves from entering the user's pupil.

In addition, according to one embodiment of the present specification, the graphene sheet may be provided as a patterned layer on a region of the lens substrate, which corresponds to the iris of an eyeball. Specifically, the graphene sheet may be patterned on a region of the lens substrate, which corresponds to the pupil periphery (iris), so that the graphene sheet may shield electromagnetic waves from entering the pupil periphery, while increasing the user's visibility.

Furthermore, if necessary, the graphene sheet may be provided as a patterned layer having various shapes.

According to one embodiment of the present disclosure, the sheet resistance value of the functional layer may be 10 Ω/sq to 50 kΩ/sq. Specifically, according to one embodiment of the present disclosure, the sheet resistance value of the functional layer may be 100 Ω/sq to 1 kΩ/sq, or 300 Ω/sq to 1 kΩ/sq. In addition, specifically, according to one embodiment of the present disclosure, the sheet resistance value of the functional layer may be 500 Ω/sq to 700 Ω/sq. Specifically, according to one embodiment of the present disclosure, the sheet resistance value of the functional layer may be 550 Ω/sq to 650 Ω/sq.

According to one embodiment of the present disclosure, the physical properties of the graphene sheet included in the functional layer may be little different from those of a graphene sheet formed on a flat plate, even though the graphene sheet is provided on the curved lens substrate.

According to one embodiment of the present disclosure, the water permeability of the functional contact lens may be 0.001 g/m²·day to 3 g/m²·day at 38° C. Specifically, according to one embodiment of the present disclosure, the water permeability of the functional contact lens may be 0.01 g/m²·day to 1 g/m²·day at 38° C. In addition, according to one embodiment of the present disclosure, the water permeability of the functional contact lens may be 0.05 g/m²·day to 0.1 g/m²·day, or 0.06 g/m²·day to 0.9 g/m²·day, at 38° C.

The functional contact lens may have lower water permeability than a lens substrate that does not include the functional layer. Specifically, as the functional contact lens has low water permeability within the above-described range, the functional contact lens may prevent dry eye by effectively preventing water evaporation from an eyeball.

FIG. 2 schematically illustrates the water evaporation suppression effect of the functional contact lens according to one embodiment of the present disclosure. Specifically, FIG. 2(a) shows that when a common contact lens including no functional layer is worn on an eyeball, tear fluids or saline solution is easily evaporated, and thus the contact lens and the eyeball become dry. On the contrary, FIG. 2(b) shows that when the functional contact lens of the present disclosure, which includes the functional layer, is worn on an eyeball, tear fluids or saline solution is not easily evaporated, and thus the eyeball does not become dry.

According to one embodiment of the present disclosure, the lens substrate may be a contact lens that is generally used. As the lens substrate, a commercially available contact lens may be used.

According to one embodiment of the present disclosure, the lens substrate may be based on silicon hydrogel, poly(2-hydroxyethylmethacrylate) (PHEMA), polymethyl methacrylate (PMMA), poly(lactic-glycolic acid) (PLGA), polyvinylpyrrolidone (PVP), or polyvinyl acetate (PVA).

According to one embodiment of the present disclosure, the functional contact lens may include a wearable device provided on the functional layer. The wearable device may be a display or sensor including a microelectronic circuit, and the functional layer may protect an eyeball by effectively shielding electromagnetic waves generated from the wearable device.

One embodiment of the present disclosure provides a method for manufacturing the functional contact lens. Specifically, one embodiment of the present disclosure provides a method for manufacturing the functional contact lens, including the steps of: preparing a lens substrate; forming a graphene sheet on a graphene growth support; forming a polymer support layer on the graphene sheet; removing the graphene growth support; and transferring the graphene sheet provided on the polymer support layer onto at least one surface of the lens substrate.

According to one embodiment of the present disclosure, the step of preparing the lens substrate may include preparing a conventional contact lens. As the lens substrate, a commercially available contact lens may be used.

According to one embodiment of the present disclosure, the step of forming the graphene sheet may be performed using chemical vapor deposition.

Specifically, according to one embodiment of the present disclosure, the step of forming the graphene sheet may include forming the graphene sheet on the graphene growth support by rapid thermal chemical vapor deposition (RT-CVD), inductively coupled plasma-chemical vapor deposition (ICP-CVD), low-pressure chemical vapor deposition (LPCVD), atmospheric-pressure chemical vapor deposition (APCVD), metal organic chemical vapor deposition (MOCVD), or plasma-enhanced chemical vapor deposition (PECVD).

According to one embodiment of the present specification, the step of forming the graphene sheet may be performed under atmospheric pressure, low pressure or vacuum. Specifically, when the step of forming the graphene sheet is performed under an atmospheric pressure condition, damage to the graphene, which is caused by collision with heavy argon (Ar) gas at high temperature, may be minimized by using helium (He) or the like as a carrier gas. In addition, when the step of forming the graphene sheet is performed under an atmospheric pressure condition, there is an advantage in that the graphene sheet may be produced by a simple process at low costs. Furthermore, when the step of forming the graphene sheet is performed under a low pressure or vacuum condition, a high-quality graphene sheet may be synthesized by reducing the oxidized surface of a metal catalyst by treatment at elevated temperature while using hydrogen as an atmospheric gas.

According to one embodiment of the present disclosure, the material of the graphene growth support may include one or more metals or alloys selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, and Ge. When the graphene growth support is made of a metal, the graphene growth support itself may serve as a catalyst allowing the graphene sheet to be formed. However, the graphene growth support does not necessarily need to be made of a metal, and may be made of, for example, silicon. When the graphene growth support is made of silicon, a silicon oxide layer may be formed by oxidizing the graphene growth support made of silicon, in order to form a catalyst layer on the graphene growth support. In addition, the graphene growth support may be a thin film or foil type metallic support.

According to one embodiment of the present disclosure, the graphene growth support may further include a catalyst layer. The catalyst layer may be provided to facilitate the formation of the graphene sheet on the graphene growth support. The catalyst layer can be used without particular limitation on the material, thickness and shape thereof. Specifically, the catalyst layer may include one or more metals or alloys selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, and Ge, and may be formed of a material identical to or different from that of the graphene growth support.

According to one embodiment of the present disclosure, in the step of forming the graphene sheet, the graphene sheet may be grown by placing a thin film or foil type metallic graphene growth support in a furnace and supplying a reaction gas containing a carbon source therein, followed by heat treatment at atmospheric pressure or a pressure lower than atmospheric pressure. Specifically, in the step of forming the graphene sheet, the carbon source is heat-treated at a temperature of 300° C. to 2,000° C. while being supplied in the vapor phase, whereby a graphene sheet having a hexagonal plate-like structure may be formed on the graphene growth support by the bonding of carbon components present in the carbon source.

According to one embodiment of the present disclosure, the carbon source may include at least one gas selected from among carbon monoxide, carbon dioxide, methane, ethane, ethylene, ethanol, acetylene, propane, butane, butadiene, pentane, pentene, cyclopentadiene, hexane, cyclohexane, benzene, and toluene.

According to one embodiment of the present disclosure, the polymer support layer may function as a support for transferring the graphene sheet. Specifically, the polymer support layer may function to fix the graphene sheet when the graphene growth support is removed after formation of the graphene sheet.

According to one embodiment of the present disclosure, the polymer support layer may include at least one of PDMS, PMMA, polystyrene, PVC, polybutadiene, SBS rubber, and polyurethane, but is not limited thereto.

According to one embodiment of the present disclosure, the step of removing the graphene growth support may include removing the graphene growth support by an etching method using an etching solution, a hydrogen bubbling method, or a physical exfoliation method. However, the step of removing the graphene growth support is not limited thereto, any method may be applied as long as is a method of removing the graphene growth support without damaging the graphene sheet.

The etching solution is a solution that may selectively remove the graphene growth support or separate the graphene growth support from the graphene sheet. As the etching solution, any etching solution may be used without limitation as long as it is one that is conventionally used in the art.

Specifically, the etching solution may be a solution including at least one of ammonium persulfate $(NH_5)_2S_2O_8$, HF, BOE, $Fe(NO_3)_3$, iron(III) chloride $(FeCl_3)$, and $CuCl_2$, but is not limited thereto.

According to one embodiment of the present disclosure, the step of transferring the graphene sheet provided on the polymer support layer onto at least one surface of the lens substrate may include attaching the graphene sheet to the lens substrate.

According to one embodiment of the present disclosure, the lens substrate may be fixed to a mold having a spherical surface identical or similar to that of the lens substrate in order to easily perform the transfer of the graphene sheet, and then the graphene sheet may be transferred onto the lens substrate.

The manufacturing method according to one embodiment of the present disclosure may further include, after the step of transferring the graphene sheet, a step of drying the lens substrate including the graphene sheet. The step of drying the lens substrate including the graphene sheet may function to increase the adhesion between the lens substrate and the graphene sheet. Specifically, through the step of drying the lens substrate, the adhesion between the lens substrate and the graphene sheet may be increased by evaporating water between the lens substrate and the graphene sheet.

According to one embodiment of the present disclosure, the step of drying the lens substrate may be performed after the lens substrate having the graphene sheet transferred thereto is washed with distilled water.

According to one embodiment of the present disclosure, the step of drying the lens substrate may be performed at a temperature of 50° C. to 100° C. for 10 minutes to 120 minutes. Specifically, the step of drying the lens substrate may be performed at a temperature of 60° C. to 90° C. for 10 minutes to minutes.

The manufacturing method according to one embodiment of the present disclosure may further include, after the step of transferring the graphene sheet, a step of removing the polymer support layer. In addition, according to one embodiment of the present disclosure, the step of removing the polymer support layer may be performed after the step of drying the lens substrate including the graphene sheet.

Specifically, the step of removing the polymer support layer may be performed using an organic solvent capable of dissolving the polymer support layer without damaging the lens substrate. Specifically, the step of removing the polymer support layer may include removing the polymer support layer using an organic solvent such as acetone without damaging the lens substrate. The organic solvent is not limited to acetone, and any organic solvent may be used without limitation as long as it is capable of dissolving the polymer support layer without damaging the lens substrate.

According to one embodiment of the present disclosure, the manufacturing method may not include the step of removing the polymer support layer. Specifically, the polymer support layer may be retained on the graphene sheet without being removed. More specifically, the polymer support layer may be a transparent polymer layer serving as a protective layer that protects the graphene sheet.

According to one embodiment of the present disclosure, a multilayer graphene sheet may be formed on the lens substrate by repeatedly performing the step of transferring the graphene sheet provided on the polymer support layer onto at least one surface of the lens substrate and the step of removing the polymer support layer.

According to one embodiment of the present disclosure, the step of forming the graphene sheet may include forming a graphene sheet having one or more layers on the graphene growth support. When a multilayer graphene sheet is formed in the step of forming the graphene sheet, a multilayer graphene sheet may be formed on the lens substrate by performing a step of transferring the multilayer graphene sheet provided on the graphene growth support onto at least one surface of the lens substrate.

According to one embodiment of the present disclosure, the graphene sheet provided on the polymer support layer may be a multilayer graphene sheet. Specifically, after the step of removing the graphene growth support, a process of transferring the graphene sheet provided on the polymer support layer onto a graphene sheet formed on a separate graphene growth support and removing the separate graphene growth support may be repeated, thereby providing a multilayer graphene sheet on the polymer support layer.

According to one embodiment of the present disclosure, the manufacturing method may further include, after the step of forming the graphene sheet, a step of patterning the graphene sheet.

To perform the step of patterning the graphene sheet, a method generally known in the art may be used without limitation. Specifically, the step of patterning the graphene sheet may include patterning the graphene sheet by a photolithography process.

According to one embodiment of the present disclosure, the manufacturing method may further include, after the step of removing the polymer support layer, a step of immersing the lens substrate including the graphene sheet in an aqueous solution. This step of immersing the lens substrate may prevent wrinkles from occurring due to shrinkage of the graphene sheet immediately after the step of drying the lens substrate, or bring the graphene sheet into close contact with the lens substrate. According to one embodiment of the present disclosure, distilled water or saline solution may be used as the aqueous solution.

Mode for Invention

Hereinafter, the present disclosure will be described in detail with reference to examples. However, the examples according to the present disclosure may be modified into various different forms, and the scope of the present disclosure is not interpreted as being limited to Examples described below. The Examples of the present specification are provided to more completely explain the present disclosure to those skilled in the art.

Example

As a graphene growth support, a high-purity copper foil (Alfa Aesar, 99.99%) was loaded into a quartz tube CVD reactor having a diameter of 8 inches. Then, 15 sccm or less of $H_2$ gas was supplied in an atmosphere of 1,000° C. for 1 hour, and then 150 sccm of $CH_4$ gas was supplied in in an atmosphere of 1,000° C. for 30 minutes, thereby growing a monolayer graphene sheet. Furthermore, the resulting graphene growth support was cooled rapidly while supplying 15 sccm or less of $H_2$ gas, thereby forming a monolayer graphene sheet on the graphene growth support.

On the graphene sheet produced as described above, a PMMA solution was spin-coated to form a polymer support layer. Thereafter, the graphene growth support was removed by etching with 0.1 M ammonium sulfate solution, followed by washing with distilled water.

Furthermore, as a lens substrate, a commercially available contact lens (INTEROJO, 1Day Clalen) was prepared and fixed to a mold having a curvature radius similar to that of the contact lens, and then the graphene sheet provided on the polymer support layer was transferred onto the lens substrate.

Next, the lens substrate having the graphene sheet transferred thereto was dried using a hot plate at 80° C., and then the polymer support layer was removed using acetone.

Then, the graphene sheet was cut according to the size of the lens substrate, and the lens substrate was separated from the mold, thereby manufacturing a functional contact lens including the graphene sheet as a functional layer.

FIG. 3 illustrates a manufacturing process according to one embodiment of the present disclosure. The manufacturing process illustrated in FIG. 3 may be clearly understood from the manufacturing process described in the Example.

Comparative Example 1

The contact lens (INTEROJO, 1Day Clalen) used in the Example, which did not include the functional layer, was used as a contact lens according to a Comparative Example.

[Test Example 1] Test for Light Transmittance of Functional Contact Lens

In order to confirm whether or not the light transmittance of the functional contact lens according to the Example would decrease, visual comparison with the contact lens according to Comparative Example 1 was performed and the wavelength-dependent light transmittances of the contact lenses were measured. For measurement of the light transmittances, a Nikon ECLIPSE LV100ND microscope was used to measure the wavelength-dependent light transmittances of the functional contact lens according to the Example and the contact lens according to the Comparative Example.

FIG. 4 is a graph obtained by measuring the wavelength-dependent light transmittances of the functional contact lens according to the Example and the contact lens according to Comparative Example 1. Referring to FIG. 4, it can be seen that even though the functional contact lens according to the Example includes the functional layer, the functional contact lens shows a light transmittance comparable to the light transmittance of the contact lens according to Comparative Example 1.

FIG. 5 illustrates samples for visual observation of the functional contact lens according to the Example and the contact lens according to Comparative Example 1. Referring to FIG. 5, it can be seen that the difference in light transmittance between the functional contact lens according to the Example and the contact lens according to Comparative Example 1 cannot be visually recognized. Therefore, since the functional contact lens according to the Example has an excellent light transmittance even though it includes the functional layer, a user may not feel the difference between the functional contact lens and a common contact lens when the user wears the functional contact lens.

[Test Example 2] Test for Electrical Properties of Graphene Sheet of Functional Contact Lens In order to examine whether or not there is deterioration in the physical properties of the graphene sheet provided on the curved lens substrate, a graphene sheet (Comparative Example 2) formed on a flat PET substrate in place of a spherical lens substrate was prepared in the same manner as described in the Example, and the electrical properties thereof were compared with those of the graphene sheet of the functional contact lens according to the Example.

Specifically, an electrode was formed on each of the graphene sheet of the functional contact lens according to the Example and the graphene sheet formed on the flat PET substrate, and the sheet resistance of each of the graphene sheets was measured using a 4-point probe nanovoltmeter (Keithley 6221).

FIG. 6 shows sheet resistance values according to Test Example 2. Specifically, referring to FIG. 5, it can be seen that the sheet resistance value of the functional contact lens according to the Example shows no significant difference from the sheet resistance value of the graphene sheet according to Comparative Example 2. Accordingly, it can be seen that there is little deterioration in the physical properties of the graphene sheet of the functional contact lens according to the Example, which includes the graphene sheet provided on the curved lens substrate.

[Test Example 3] Test for Electromagnetic Wave Shielding Performance of Functional Contact Lens In order to confirm the electromagnetic wave shielding performance of the functional contact lens according to the Example, a drop of egg white was placed, and each of the functional contact lens according to the Example and the contact lens according to Comparative Example 1 was attached onto a curved transparent polypropylene cover capable of covering the egg white drop, and then exposed to electromagnetic waves at 120 W for about 50 seconds in a microwave oven that generates electromagnetic waves having a frequency of 2.45 GHz.

FIG. 7 schematically shows the section of a sample prepared in order to examine electromagnetic wave shielding performance according to Test Example 3. Specifically, FIG. 7 shows the section of a sample obtained by preparing the curved transparent cover, capable of covering the egg white, on a silicon wafer, and then attaching the functional contact lens according to the Example and the contact lens according to Comparative Example 1 to the cover.

FIG. 8 shows the results of the Example and Comparative Example 1 after the exposure to electromagnetic waves according to Test Example 3. Specifically, it can be seen that the egg white located inside the functional contact lens according to the Example was hardly heated by electromagnetic waves, and thus remained in a transparent state. On the contrary, it can be seen that the egg white located inside the contact lens according to Comparative Example 1 was completely done due to heating by electromagnetic waves, and thus became opaque.

From these results, it can be seen that the functional contact lens according to the Example effectively shields electromagnetic waves entering from the outside.

[Test Example 4] Test for Water Permeability of Functional Contact Lens

In order to examine the water permeability of the functional contact lens according to the Example, the mouth of a vial containing distilled water was sealed with each of the functional contact lens according to the Example and the contact lens according to Comparative Example 1. Then, each of the vials was left to stand in an atmosphere of 38° C. for 7 days, and a decrement in the amount of distilled water in each vial was measured.

FIG. 9 shows the results of the water permeability test performed to Test Example 4. Specifically, referring to FIG. 9, in the case of the vial sealed with the contact lens including no functional layer, a decrement in the amount of water after 7 days was 0.8268 g, and in the case of the vial sealed with the functional contact lens according to the Example, a decrement in the amount of water after 7 days was g. That is, it can be seen that the decrement in the amount of water in the vial sealed with the functional contact lens according to the Example was significantly smaller than that in the vial sealed with the contact lens according to Comparative Example 1.

FIG. 10 shows the data obtained by measuring the water permeabilities of the functional contact lens according to the Example and the contact lens according to Comparative Example 1. Referring to FIG. 10, it can be seen that the functional contact lens according to the Example has water permeability lower than that of the contact lens according to Comparative Example 1 due to the functional layer thereof. Accordingly, it can be easily expected that when a user wears the functional contact lens according to the Example, water evaporation from the user's eyeball can be prevented.

Each of the water permeabilities is a value from the mean and standard deviation of the data for the decrement in the amount of water shown in FIG. 9. Specifically, each of the water permeabilities is a value obtained by calculating the variation in the amount of water, measured when the vial sealed with each of the contact lens was left to stand in an atmosphere of 38° C. for 7 days, as the variation in the amount of water per day per in the area of the mouth of the vial.

As can be seen from the Test Examples above, the functional contact lens according to the present disclosure may exhibit excellent electromagnetic wave shielding performance and effectively protect the user's eyeball from electromagnetic waves. Furthermore, it can be seen that the functional contact lens according to the present disclosure may prevent dry eye by effectively suppressing water evaporation from the eyeball, and even though the graphene sheet is provided on the curved lens substrate, deterioration in the physical properties of the graphene sheet hardly occurs. In addition, even though the functional contact lens according to the present disclosure includes the functional layer, the functional contact lens has an advantage in that a decrease in the light transmittance of the functional contact lens can be minimized, and thus a user cannot feel the difference between the functional contact lens and a common contact lens when the user wears the functional contact lens.

The invention claimed is:

1. A functional contact lens comprising:
a lens substrate having a spherically curved surface so as to be worn on an eyeball; and
a functional layer provided on at least one surface of the lens substrate and comprising a graphene sheet,
wherein the graphene sheet is provided as a patterned layer on a region of the lens substrate, which covers an outer circumference of an iris of the eyeball, and
wherein the graphene sheet is provided as a full-surface layer on the one surface of the lens substrate.

2. The functional contact lens of claim 1, wherein the functional layer is provided on an outer surface of the lens substrate.

3. The functional contact lens of claim 1, wherein the functional layer comprises the graphene sheet having 1 to 10 layers.

4. The functional contact lens of claim 1, wherein the functional layer absorbs or reflects electromagnetic waves entering from an outside.

5. The functional contact lens of claim 1, wherein the functional contact lens has a water permeability of 0.001 g/m$^2$·day to 3 g/m$^2$·day at 38° C.

6. The functional contact lens of claim 1, wherein the functional layer has a sheet resistance value of 10 Ω/sq to 50 kΩ/sq.

7. The functional contact lens of claim 1, wherein the functional layer has a light transmittance of 50% to 98% at a wavelength of 550 nm.

8. The functional contact lens of claim 1, wherein the lens substrate is based on silicone hydrogel, poly(2-hydroxyethylmethacrylate) (PHEMA), polymethyl methacrylate (PMMA), poly(lactic-glycolic acid) (PLGA), polyvinylpyrrolidone (PVP), or polyvinyl acetate (PVA).

9. A method for manufacturing the functional contact lens according to claim 1, comprising the steps of:
preparing a lens substrate;
forming a graphene sheet on a graphene growth support;
forming a polymer support layer on the graphene sheet;
removing the graphene growth support; and
transferring the graphene sheet provided on the polymer support layer onto the at least one surface of the lens substrate.

10. The method of claim 9, further comprising, after the step of transferring the graphene sheet, a step of removing the polymer support layer.

11. The method of claim 10, further comprising, after the step of removing the polymer support layer, a step of immersing the lens substrate comprising the graphene sheet in an aqueous solution.

12. The method of claim 9, wherein the step of forming the graphene sheet is performed using chemical vapor deposition.

13. The method of claim 9, further comprising, after the step of transferring the graphene sheet, a step of drying the lens substrate comprising the graphene sheet.

* * * * *